United States Patent [19]

Colombier

[11] Patent Number: 5,272,242

[45] Date of Patent: * Dec. 21, 1993

[54] HYDRAZINO/POLYHYDROSILAZANES

[75] Inventor: Christian Colombier, Lyons, France

[73] Assignee: Atochem, Puteaux, France

[*] Notice: The portion of the term of this patent subsequent to Apr. 23, 2008 has been disclaimed.

[21] Appl. No.: 393,957

[22] Filed: Aug. 15, 1989

[30] Foreign Application Priority Data

Aug. 17, 1988 [FR] France .................. 88 10952

[51] Int. Cl.⁵ .............................. C08G 77/38
[52] U.S. Cl. .................... 528/28; 525/474; 528/10; 528/33; 528/38
[58] Field of Search ............ 528/28, 38, 10, 33; 525/474

[56] References Cited

U.S. PATENT DOCUMENTS

| | | |
|---|---|---|
| 3,853,567 | 12/1974 | Verbeek . |
| 4,612,383 | 9/1986 | Laine et al. ................. 528/15 |
| 4,975,512 | 12/1990 | Funayama et al. ........... 525/474 |
| 5,010,158 | 4/1991 | Colombier et al. .......... 528/28 |
| 5,066,734 | 11/1991 | Colombier .................. 528/10 |

FOREIGN PATENT DOCUMENTS

| | | |
|---|---|---|
| 0304239 | 2/1989 | European Pat. Off. . |
| 2190764 | 12/1974 | France . |
| 8606377 | 11/1986 | PCT Int'l Appl. . |
| 8705298 | 9/1987 | PCT Int'l Appl. . |

*Primary Examiner*—Melvyn I. Marquis
*Attorney, Agent, or Firm*—Burns, Doane, Swecker & Mathis

[57] ABSTRACT

Novel high viscosity polyhydrosilazanes containing recurring structural units of the formula:

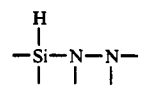

are prepared by reacting a halosilane with ammonia and/or an amine, and then reacting the ammonolysate thus produced with a hydrazine compound.

12 Claims, No Drawings

HYDRAZINO/POLYHYDROSILAZANES

BACKGROUND OF THE INVENTION

1. Field of the Invention

The present invention relates to novel polysilazanes comprising

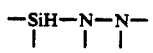

recurring structural units, hereinafter designated polyhydrosilazanes, and to a process for the preparation of such novel polyhydrosilazanes.

2. Description of the Prior Art

It is known to this art (French Patent 2,190,764) to prepare polysilazanes by reacting a halosilane with a compound bearing one or more $NH_2$ or NH groups.

Although this '764 patent refers only to the use of amine and, more precisely, of methylamine, a great number of compounds containing an $NH_2$ or NH group are proposed, among which the hydrazines are included. In this particular case of hydrazine, with $CH_3HSiCl_2$ it is found that the reaction is therefore of the type:

$$CH_3HSiCl_2 + 4NH_2NH_2 \rightarrow CH_3SiH(N-H-NH_2)_2 + 2NH_2NH_2 \cdot HCl$$

Stated differently the formation of the hydrazinosilazane or cyclosilazane $(CH_3HSiNH-NH)_n$ is accompanied by the formation of a number of moles of hydrazine hydrochloride which is substantially equal to the number of moles of hydrazine bonded onto the silicon atom by the substitution of chlorine. In light of the cost of hydrazine, it then appears necessary to separate off the hydrazine hydrochloride and to recover the hydrazine itself, generally by addition of sodium hydroxide, followed by an azeotropic distillation or a zone crystallization.

SUMMARY OF THE INVENTION

A major object of the present invention is the provision of an improved process for the preparation of polyhydrosilazanes derived from hydrazine, i.e., containing a plurality of recurring structural units of the formulae:

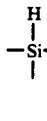 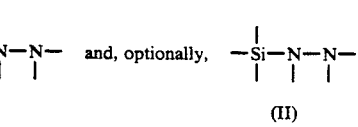

(I) and, optionally, (II)

and, optionally, of the recurring structural units:

 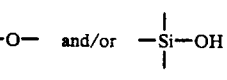

(III) and/or (IV)

in which the available valencies of the silicon and nitrogen atoms are bonded to a hydrogen atom, a saturated or unsaturated aliphatic hydrocarbon radical or a mono- or polycyclic aryl, alkylaryl or arylalkyl radical, said improved process comprising:

(a) preparing a polysilazane containing recurring structural units of the formula:

(V)

(b) reacting said polysilazane with a hydrazine of the formula:

(VI)

and optionally water, to thereby produce polymers containing such units of formulae (I) and/or (II) and optionally (III) and/or (IV).

DETAILED DESCRIPTION OF THE PREFERRED EMBODIMENTS OF THE INVENTION

More particularly according to the present invention, by the expression "available valencies" are intended the valences of the silicon and nitrogen atoms other than the valences used for the bonds between the units of the formulae (I), (II), (III) and (IV) in the polymer chain sequences.

Exemplary of radicals which can be bonded to the silicon and nitrogen atoms in the above formulae, particularly representative are, in addition to hydrogen, saturated aliphatic hydrocarbon radicals containing from 1 to 8 carbon atoms, unsaturated hydrocarbon radicals such as vinyl and allyl, alicyclic radicals containing from 3 to 7 carbon atoms, and phenyl, benzyl, phenylethyl, tolyl, xylyl or naphthyl radicals.

The silicon atoms preferably bear methyl, ethyl, vinyl or phenyl substituents, while the nitrogen atoms preferably bear hydrogen atoms.

To prepare the polysilazane containing the units of formula (V), a hydrohalosilane may advantageously be reacted with ammonia or a primary amine.

It is possible, in particular, to employ one or more hydrohalosilane(s) of the formula:

$$HSi(Y)_a \qquad (VII)$$

in which Y is a halogen atom and especially a chlorine atom a=1 or 2, preferably 2.

Exemplary of the halosilanes of formula (VII), particularly representative are the compounds corresponding to the following formulae:

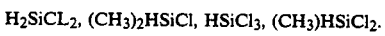

However, also included are halosilanes devoid of hydrogen bonded to silicon, such as:

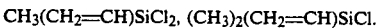

In the preferred embodiment given above, it follows that one or more dihalosilanes or a mixture comprising one or more dihalosilanes and a mono- or trihalosilane and/or SiCl₄ is advantageously used according to the present invention. The percentage of chlorine atoms contributed by the trihalosilane in the mixture with the dihalosilane preferably does not exceed 70%. In the case of monohalosilane or of SiCl₄, this percentage preferably does not exceed 30%.

Exemplary of the primary amines which can be employed, particularly representative are methylamine, ethylamine, cyclohexylamine and aniline.

During this first step, an amount of ammonia and/or of amine is advantageously used such as to provide a number of moles of ammonia and/or of amine greater than the number of moles of halogen atoms Y added to the number of moles of silicon atoms.

This excess may be up to 50%. The ammonia and/or the amine are advantageously used in a diluted form, for example with nitrogen. The reaction may be carried out at a temperature which can range from −20° C. to 200° C. or the boiling point of the optional solvent, when such temperature is below 200° C. at atmospheric pressure. It is also possible to carry out the reaction at subatmospheric or superatmospheric pressure.

The reaction is advantageously conducted in an organic solvent medium. Exemplary of such solvents, particularly representative are the hydrocarbons, optionally chlorinated, such as methylene chloride, chloroform, carbon tetrachloride, toluene, benzene, or ethers such as diethyl ether or diisopropyl ether.

During this reaction, the hydrogen halide acid formed precipitates in the form of ammonium halide, which can be removed by filtration. The solvent for the polysilazane may be removed by evaporation.

In general, a cyclic or linear polysilazane comprising recurring structural units of formula (V), of relatively low viscosity, namely, on the order of a few tenths of a poise to a few poises, is recovered upon completion of this reaction, which can last from a few tens of minutes to a few hours.

The second stage of the process in accordance with the invention entails reacting the polysilazane formed during the preceding stage with a hydrazine of formula (VI).

Exemplary of the hydrazines of formula (VI), particularly representative are unsubstituted hydrazine (N₂H₄), methylhydrazine, ethylhydrazine, phenylhydrazine, cyclohexylhydrazine, dimethylhydrazine, diethylhydrazine, diphenylhydrazine, dibenzylhydrazine, α-naphthylhydrazine, diisopropylhydrazine, ditolylhydrazines, diisobutylhydrazine, (2,3-dimethylphenyl)hydrazine and 1,2-di(α-naphthyl)hydrazine.

A mixture comprising several hydrazines and especially several of the compounds specifically exemplified may be employed in the invention. Hydrazine, N₂H₄, is preferably used.

In general, an amount of hydrazine and optionally of water is used which is sufficient to permit the substitution of the

groups in the formula (V) by the

groups and the radicals —O— and OH of the formulae (I), (II), (III) and (IV).

However, it is possible to substitute only a part the in the

groups in the formulae (V) and consequently to form polysilazanes containing at the same time units of formula (V) and units of the formulae (I) and (II) and optionally (III), and/or (IV).

Thus, the present invention also features such novel polyhydrosilazanes, per se.

Assuming a complete or virtually complete substitution of the abovementioned

groups, an excess of hydrazine of formula (VI) is advantageously employed, it being possible for this excess to represent several times the theoretical amount required for such substitution.

The hydrazine of formula (VI) may be used in anhydrous form or in hydrated form, or else in the form of an aqueous solution, and the reaction temperature may range, for example, from 20° to 150° C. at atmospheric pressure. When water is used, it is preferred not to exceed one mole of water per mole of hydrazine. The reaction is accompanied by a release of ammonia and/or of amine and of hydrogen, according to the following reaction scheme, given strictly by way of example and which in no event is intended to be limiting:

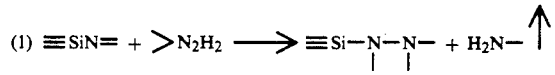

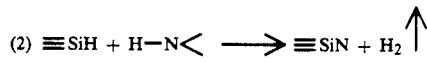

these two reactions being virtually simultaneous.

Ceasing of the aforementioned gas releases indicates completion of the reaction, at the end of a period of time which can range for a few tens of minutes to a few hours. It is advantageous to introduce an organic solvent into the reaction mixture, it being possible for same to be selected, for example, from among the compounds mentioned above. After separation of the dense phase, containing the excess hydrazine which has not reacted, and evaporation of the solvent, a polyhydrosilazane is collected, containing a plurality of recurring structural units of formulae (I) and (II), in the form of a viscous liquid (it being possible for the viscosity to range from a few poises to several hundred or even thousands of poises).

The polyhydrosilazanes may then be converted at ambient temperature or after heating to a temperature which may be as high as 300° C., for example by spinning through dies of suitable sizes to produce filaments whose diameters range from 1 to 10? μm.

Using such polyhydrosilazanes, optionally dissolved, it is also possible to form coatings on substrates such as metals (metallic silicon, steel, molybdenum, nickel-rich alloys) or ceramics, the thickness of such coatings being, for example, on the order of 0.01 to 100 μm. In the case where the coating contains an additive such as silicon carbide or nitride powders, this thickness may be up to several millimeters.

In this coating application, the polyhydrosilazane is preferably employed in solution in an organic solvent such as toluene, at a concentration on the order of 1% to 20% by weight.

Independently of its considerable advantage where the consumption of hydrazine is concerned, it should be appreciated that this two-stage process makes it possible to obtain a much superior yield of ceramic, when compared with a process employing only ammonia, as described, for example, in French Patent 2,197,829.

The converted polyhydrosilazanes can then be pyrolyzed by heating to a temperature on the order of 800° to 1,500° C. into a ceramic material containing Si, N and optionally C and/or O.

The pyrolysis may be conducted in a neutral atmosphere, for example under nitrogen or argon, or in an atmosphere of ammonia if it is intended to lower the carbon content of the ceramic and even to eliminate it.

The polyhydrosilazanes in accordance with the invention can be obtained in high yields and can themselves be converted into ceramics yields which are generally higher than 60%.

In order to further illustrate the present invention and the advantages thereof, the following specific examples are given, it being understood that same are intended only as illustrative and in nowise limitative.

In said examples to follow, the ceramic yield value (=weight of ceramic obtained/weight of precursor introduced ×100) was measured by thermogravimetric analysis without confinement and under a nitrogen purge. The temperature increase was 100° C./hour and was followed by a plateau of one hour at 1,000° C., the maximum temperature.

EXAMPLE 1

(A) Synthesis of an ammonolysate of $CH_3SiHCl_2$

The reaction was carried out in a jacketed reactor fitted with a thermometer, a stirring system and a condenser (15° C.).

800 ml of toluene and 1.2 moles of $CH_3SiHCl_2$ were poured at 15° C. into the reactor after it had been purged with nitrogen. The reactor was cooled to 2° C. and 4.66 moles of $NH_3$ diluted with 2.33 moles of $N_2$ were introduced at a constant rate under stirring over 6 hours. During the last hour, the reaction temperature was increased to 20° C. Gentle stirring was continued for 15 hours at 15° C. The ammonium chloride was filtered off under nitrogen and was washed with two 400-ml portions of toluene. The ammonolysate solution was then treated by evaporating off the solvent at 60° C. under vacuum with the aid of a rotary evaporator. The evaporation was completed by maintaining the material for ½ hour at 60° C. at approximately 5 mm Hg. 56 g of ammonolysate were collected, which corresponded to a 79.1% yield based on the formation of the units:

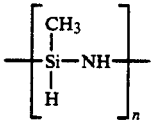

This ammonolysate, having a viscosity of ≈0.4 poises at 25° C., constituted a ceramic yield of 42%.

(B) Substitution of the ammonolysate produced under (A)

24.1 g of the ammonolysate were employed and 13.06 g of anhydrous hydrazine were added. The emulsified mixture was stirred and heated progressively to 70° C. over 30 min under a nitrogen purge. This temperature was maintained for another 6 hours. A major release of ammonia and of hydrogen was observed as soon as the heating period commenced.

In all, approximately 0.15 moles of $NH_3$ were released.

Approximately 50 ml of toluene were added and the emulsion was permitted to separate for 15 hours in a separating funnel.

The dense phase, rich in hydrazine which had not reacted, i.e., approximately 5.8 g, was drained and toluene was evaporated off under the conditions described in Example 1. 26 g of a highly viscous polyhydrosilazane (viscosity > 10,000 poises at 25° C.), the ceramic yield of which was 68.7%, were recovered.

COMPARATIVE EXAMPLE 23.5 g of the ammonolysate prepared according to (A) in Example 1 were taken.

This ammonolysate was stirred and heated progressively to 70° C. over 30 min under a nitrogen purge. This temperature was maintained for another 6 hours. No release of ammonia or of hydrogen was observed.

Approximately 50 ml of toluene were added and this was evaporated off under the conditions described under (A). 23.4 g of ammonolysate were recovered, having a viscosity ≈0.4 poise and with a ceramic yield of 44%.

EXAMPLE 2

(A) An ammonolysate of $CH_3SiHCl_2$ was prepared as described in section (A) of Example 1.

(B) 30.3 g of a toluene solution containing 50% by weight of such ammonolysate were taken and 4.2 g of anhydrous hydrazine were added. The emulsion was stirred under a nitrogen purge and the temperature of the reactor was increased to 80° C. for 5 hours.

A release of ammonia and of hydrogen was observed as soon as the heating period commenced.

In all, 0.103 moles of ammonia were released.

The toluene was evaporated off as described in Example 1 and 16.5 g of a polyhydrosilazane which had a viscosity of approximately 250 poises at 25° C. and a ceramic yield of 67% were collected.

The product contained 58.6% (as $N_2H_4$ equivalent) of the hydrazine introduced in the form of

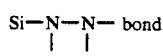

[determination carried out by acid hydrolysis (solution containing 30% by weight of $H_2SO_4$), boiling for 1 hour, adding N/10 iodine, adding sodium acetate and water, stirring, permitting to stand at ambient temperature, and determining the unused iodine using an N/10 solution of $Na_2S_2O_3X$].

This method did not enable any

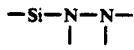

bond to be detected in the ammonolysate from stage (A).

It was also noted that the ratio $SiH/SiCH_3$ (measured by IR), which was 6 in the case of the ammonolysate from the first stage was now only 4.5 in the final product.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a poly-hydrosilazane containing a plurality of recurring structural units of the formulae:

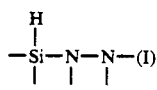

and, optionally,

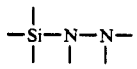
(II)

with the proviso that the structural units of formulae (I) and (II) are not identical, in which the free valencies of the silicon and nitrogen atoms are satisfied by a hydrogen atom, a saturated or unsaturated aliphatic hydrocarbon radical or a mono- or polycyclic aryl, alkylaryl or arylalkyl radical, comprising reacting a poly-silazane containing recurring structural units of the formula:

(V)

with a hydrazine of the formula:

(VI)

and optionally water accompanied by a release of ammonia or of amine and of hydrogen or mixture thereof.

2. The process as defined by claim 1, comprising preparing said polysilazane containing recurring structural units of formula (V) by reacting a hydrohalosilane of the formula:

$$[HSi(Y)_a](R)_nSi(Y)_a \qquad (VII)$$

in which Y is a halogen atom, a=1 or 2, R is a hydrogen atom, a methyl group or a chlorine atom and n=2 or 3, with ammonia and/or a primary amine.

3. The process as defined by claim 2, wherein the amount of ammonia and/or of amine used is such that the number of moles of ammonia and/or of amine is greater than the number of moles of halogen atoms Y bonded to the number of moles of silicon atoms.

4. The process as defined by claim 2, wherein the reaction of the halosilane with ammonia and/or amine is carried out in an organic solvent medium.

5. The process as defined by claim 1, wherein said hydrazine of formula (VI) comprises unsubstituted hydrazine, methylhydrazine, ethylhydrazine, phenylhydrazine, cyclohexylhydrazine, dimethylhydrazine, diethylhydrazine, diphenylhydrazine, dibenzylhydrazine, α-naphthylhydrazine, diisopropylhydrazine, ditolylhydrazines, diisobutylhydrazine, (2,3-dimethylphenyl)hydrazine or di(α-naphthyl)hydrazine.

6. The process as defined by claim 1, wherein said hydrazine and optionally water are present in sufficient amount as to permit substitution of the

group in the formula (V) by the

groups of the formulae (I) and (II).

7. The process as defined by claim 6, wherein said hydrazine and optionally water are present in an amount which is in excess of the theoretical amount required for such substitution.

8. The process as defined by claim 6, wherein the amount of water present is at most one mole per mole of hydrazine.

9. A polyhydrasilazane comprising a plurality of recurring structural units of the formulae:

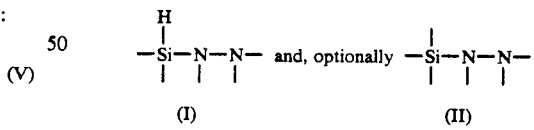

with the proviso that the structural units of formulae (I) and (II) are not identical, in which the free valencies of the silicon and nitrogen atoms are satisfied by a hydrogen atom, a saturated or unsaturated aliphatic hydrocarbon radical, or a mono- or polycyclic aryl, alkylaryl or arylalkyl radical.

10. A shaped article comprising the polyhydrosilazane as defined by claim 9.

11. A substrate coated with an effective amount of the polyhydrosilazane defined by claim 9 to coat the substrate.

12. A process for the preparation of a polyhydro-silazane containing a plurality of recurring structural units of the formulae:

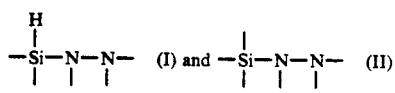  (I) and  (II)

and of one or both of the recurring structural units:

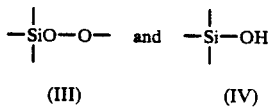

(III)          (IV)

in which the free valencies of the silicon and nitrogen atoms are satisfied by a hydrogen atom, a saturated or unsaturated aliphatic hydrocarbon radical or a mono- or polycyclic aryl, alkylaryl or arylalkyl radical, comprising reacting a poly-silazane containing recurring structural units of the formula:

$$\begin{array}{c} H \\ | \\ -Si-N- \\ | \end{array} \quad (V)$$

with a hydrazine of the formula:

$$\begin{array}{cc} | & | \\ N-N \\ | & | \end{array} \quad (VI)$$

in the presence of water accompanied by a release of ammonia or of amine and of hydrogen or mixture thereof.

* * * * *